A. POTTER.
PROCESS OF OPERATING SETTLING TANKS.
APPLICATION FILED JULY 23, 1912.
1,081,329.
Patented Dec. 16, 1913.
2 SHEETS—SHEET 1.
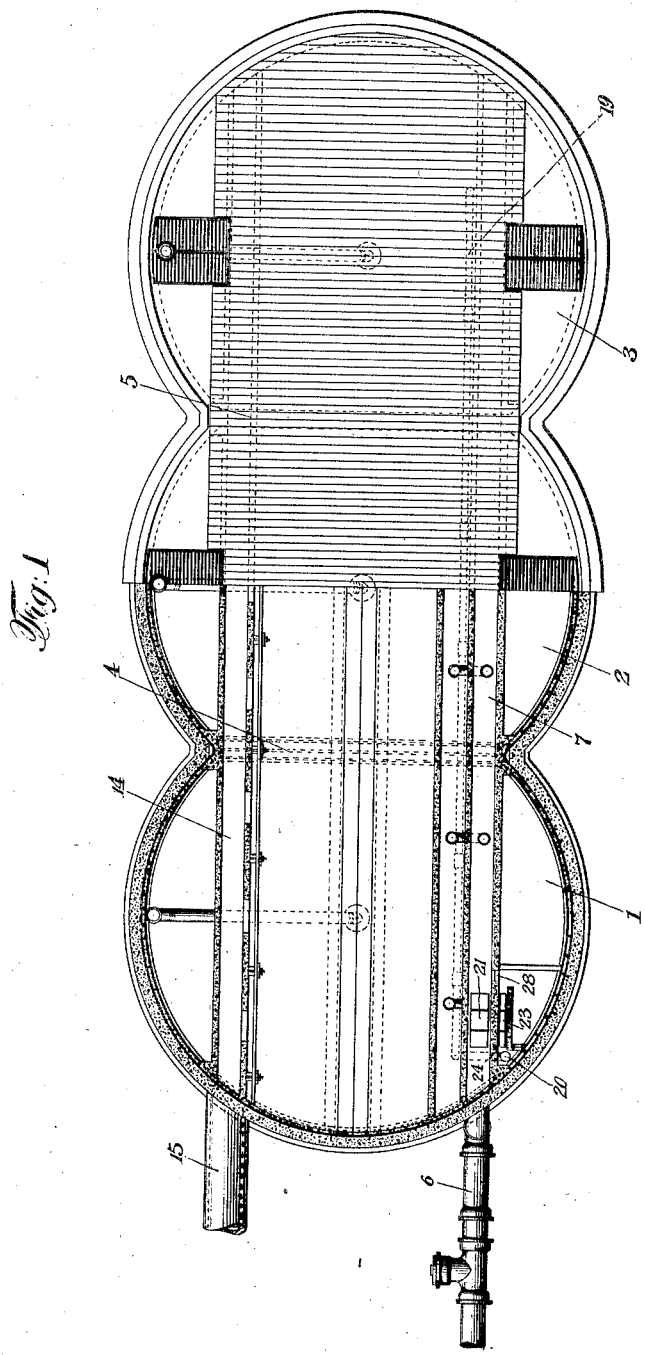

A. POTTER.
PROCESS OF OPERATING SETTLING TANKS.
APPLICATION FILED JULY 23, 1912.
1,081,329.
Patented Dec. 16, 1913.
2 SHEETS—SHEET 2.
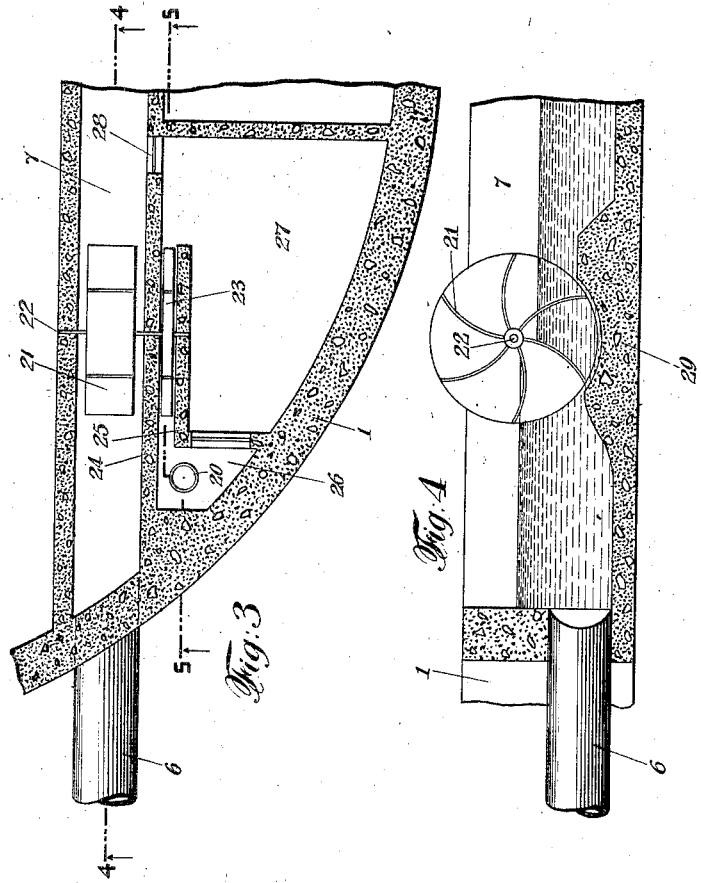
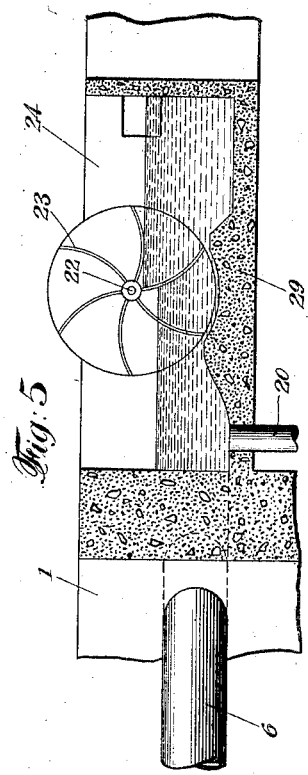
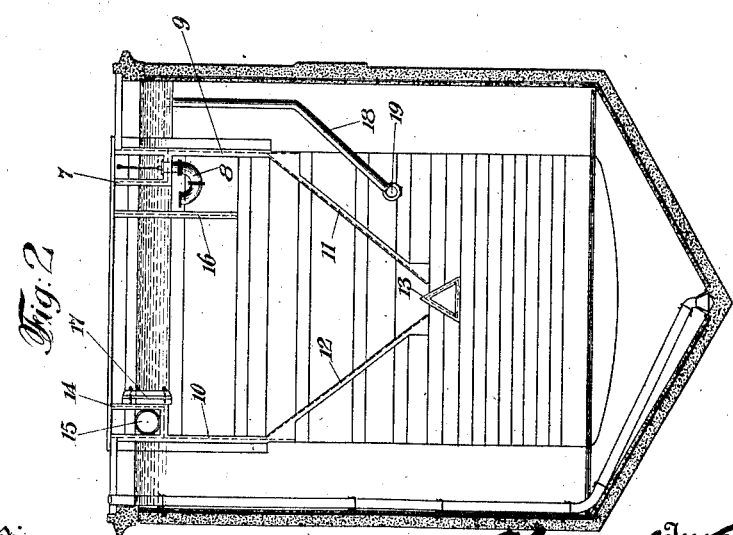

UNITED STATES PATENT OFFICE.

ALEXANDER POTTER, OF NEW YORK, N. Y.

PROCESS OF OPERATING SETTLING-TANKS.

1,081,329.   Specification of Letters Patent.   Patented Dec. 16, 1913.

Application filed July 23, 1912.   Serial No. 711,045.

*To all whom it may concern:*

Be it known that I, ALEXANDER POTTER, of New York city, in the county of New York, and in the State of New York, have invented a certain new and useful Improvement in Process of Operating Settling-Tanks, and do hereby declare that the following is a full, clear, and exact description thereof.

The object of my invention has been to provide an improved process of operating settling tanks for the disposition of sewage, which shall cause such settling to take place with greater certainty and speed than heretofore, and to such ends my invention consists in the method of operating settling tanks hereinafter specified.

In the accompanying drawings—Figures 1 and 2 are, respectively, a top plan view and a transverse sectional view of a settling tank embodying my invention; Fig. 3 is an enlarged plan view of a form of circulating devices adapted for use with my invention; and, Figs. 4 and 5 are sections respectively on the lines 4—4 and 5—5 of Fig. 3.

In the accompanying drawings I have illustrated the best embodiment of my invention known to me, but such embodiment is to be regarded as typical only of many possible embodiments and my invention is not to be limited thereto.

My invention relates to the general type of settling tanks which are used for the purpose of separating the solid matter from the water of sewage, so that the water, in a comparatively unobjectionable state, may be carried away, leaving the solid matter behind, this separation being effected in such a manner that the formation of objectionable odors is substantially prevented.

As illustrated, the said embodiment comprises three circular tanks 1, 2 and 3, divided by partition walls 4 and 5, such tanks, in the instance shown, having vertical walls closed by conical bottoms. The sewage is brought to the tanks by a main 6, entering a distributing trough 7 which extends along the series of tanks on one side of said series. At intervals this trough is provided with pipes 8 extending downward from its bottom, and having their ends directed upward so that the sewage escapes into the settling chamber hereinafter described, in a vertical direction. Each settling chamber consists of preferably vertical walls 9 and 10, having inclined walls 11 and 12 extending downward and inward from their lower edges to form the said settling chamber, the said walls 11 and 12 forming between them a slot which is partly closed by a beam 13, having inclined upper faces, so that the sludge, in passing downward through the said slot, will be thrown outward in both directions from the said beam, instead of passing directly downward. On the walls 10, opposite the walls 9, is formed an outlet trough 14 by which the clarified water may be carried away, said trough preferably having a pipe 15 for carrying away the said water.

In the operation of settling sludge in said tank, the sewage, as before described, enters the distributing trough 7, and escapes by the pipes 8 into the settling chamber. A curtain wall 16 is preferably provided to inclose the pipes 8 so that the sewage escaping from the said pipes can only pass downward and cannot pass directly across to the outlet trough. As the horizontal cross-section of the space into which the sewage is delivered by the pipes 8 is much greater than that of the said pipes, the sewage passes downward with a very slow movement. When it has passed below the level of the wall 16, it travels slowly across the tank and finally passes into the outlet trough 14, such trough being, for this purpose, provided with weirs and also being provided with a scum-board 17. The heavier portions, or sludge, settle downward and pass through the slots in the bottom of the settling chambers, and are thrown forward or back by the inclined faces of the beam 13, finally landing in the sump or depressed bottom of the tank.

I find in practice that there is a considerable quantity of the refuse material which is so nearly of the same specific gravity as the water that it remains floating in the settling chamber and does not pass down into the sludge digesting chamber beneath. It is the specific purpose of my present invention to cause this light material to pass downward into the lower chamber and also to keep the said slots open in the bottom of the settling chamber at each side of the beam 13. For this purpose, I desire to cause a downward circulation through the said slots. The specific manner in which I effect this circulation in the present embodiment is as follows: I provide a suction outlet 18 for each lower, or sludge-digesting chamber, such outlets being preferably in the form of a T connected with the horizontal pipe 19 extending through all the tanks, there being a vertical pipe 20 through which the water is to be raised to the circulating device. While it will be understood that the circulating device may take many forms, I have shown a very simple device and one operated by the flow of the incoming sludge from the main 6. Such device consists of an undershot wheel 21 mounted at the entrance to the distributing trough 7, which wheel is mounted on a shaft 22 that also carries a lift wheel 23, which latter is mounted between walls 24 and 25, the slot between said walls communicating with a chamber 26 into which the pipe 20 enters. The wheel 23 delivers the water into a chamber 27 from which it escapes into the distributing tank over an adjustable weir 28. As the water will rise in the chamber 26 by its own pressure almost to the level of that in the distributing trough, the head in the chamber 27 need only be slightly greater than that in the distributing trough, and it is only this difference in head which the wheel 23 needs to cause.

To summarize the operation of my tank according to my process, the sewage enters the tank 7 from the main 6 and is delivered by the pipes 8 between the curtain wall 16 and the side walls 9 of the settling chamber. The heavier particles of the sewage settle downward and pass through the slots into the sludge-digesting or lower chamber, while the water passes slowly across the settling chamber and beneath the scum-board and over the weirs into the trough 14, by which it is carried away. The lighter particles which would remain floating in the settling chamber, are carried downward by the circulation caused by the suction through the nozzles 18 in the lower chamber, and such lighter particles are then deposited in the lower or digesting chamber. The water which is drawn through the suction nozzles 18 for the purpose of effecting the circulation, is carried through the pipes 19 and 20 up into the chamber 26, the level of the water in such chamber being lowered by the wheel 23 so as to reduce the head in such chamber and induce the said flow to continue. The water raised by the wheel 23 is delivered into the chamber 27 and from there escapes over the weir 28 into the distributing trough. It will, of course, be understood that the wheel 23 must fit with reasonable closeness between its walls 24 and 25, and against the bottom 29, in order to effectively raise the water.

By the term "artificial circulation" in the claims is meant a forced circulation and not the natural flow of the sludge.

I claim:

1. The process of settling sewage comprising admitting sewage to one side of a tank and drawing off water from the opposite side thereof, permitting the heavier matter to settle into a lower chamber through an opening in the bottom of said tank, and causing an artificial circulation from said tank to said lower chamber.

2. The process of settling sewage comprising admitting sewage to one side of a tank and drawing off water from the opposite side thereof, permitting the heavier particles to settle into a lower chamber through an opening in the bottom of said tank, and causing an artificial local circulation through said upper tank and opening into said lower chamber and back into said upper tank without passing through said opening.

3. The process of settling sewage, comprising admitting sewage to one side of a hopper bottom chamber, drawing off the water from the opposite side thereof, permitting the sludge to settle into a lower chamber through an opening in said hopper bottom, and causing an artificial circulation from said upper chamber to said lower chamber.

4. The process of settling sewage, comprising admitting sewage to one side of a hopper bottom chamber, drawing off the water from the opposite side thereof, permitting the sludge to settle into a lower chamber through an opening in said hopper bottom, and causing a circulation from said upper chamber to said lower chamber, by drawing water from said lower chamber and delivering it into said upper chamber.

5. The process of settling sewage, comprising admitting sewage to one side of a hopper bottom chamber, drawing off the water from the opposite side thereof, permitting the sludge to settle into a lower chamber through an opening in said hopper bottom, and causing a circulation from said upper chamber to said lower chamber, by drawing water from the upper portion of said lower chamber and delivering it into the inlet portion of said upper chamber.

In testimony that I claim the foregoing I have hereunto set my hand.

ALEXANDER POTTER.

Witnesses:
ALBIN H. BEYER,
FRANCES CHAMBERLAIN.